United States Patent
Baek et al.

(10) Patent No.: US 9,189,368 B2
(45) Date of Patent: *Nov. 17, 2015

(54) SYSTEM AND METHOD FOR TESTING A USER APPLICATION USING A COMPUTING APPARATUS AND A MEDIA PLAYBACK APPARATUS

(75) Inventors: Wonjang Baek, Seongnam-si (KR); John Kim, Seoul (KR); Doo Hwan Yi, Seoul (KR)

(73) Assignee: SK PLANET CO., LTD., Seoul (KR)

( * ) Notice: Subject to any disclaimer, the term of this patent is extended or adjusted under 35 U.S.C. 154(b) by 106 days.

This patent is subject to a terminal disclaimer.

(21) Appl. No.: 13/511,607

(22) PCT Filed: Nov. 26, 2010

(86) PCT No.: PCT/KR2010/008457
§ 371 (c)(1),
(2), (4) Date: May 23, 2012

(87) PCT Pub. No.: WO2011/065783
PCT Pub. Date: Jun. 3, 2011

(65) Prior Publication Data
US 2012/0291016 A1      Nov. 15, 2012

(30) Foreign Application Priority Data
Nov. 26, 2009  (KR) .......................... 10-2009-0115297

(51) Int. Cl.
*G06F 11/36*  (2006.01)

(52) U.S. Cl.
CPC .......... *G06F 11/3668* (2013.01); *G06F 11/362* (2013.01); *G06F 11/3664* (2013.01); *G11B 2220/2541* (2013.01)

(58) Field of Classification Search
CPC G06F 11/3668; G06F 11/362; G06F 11/3664
See application file for complete search history.

(56) References Cited

U.S. PATENT DOCUMENTS

| | | | |
|---|---|---|---|
| 5,615,331 A | 3/1997 | Toorians et al. | 395/182.07 |
| 5,983,017 A | 11/1999 | Kemp et al. | 395/704 |

(Continued)

FOREIGN PATENT DOCUMENTS

| | | |
|---|---|---|
| CN | 1372662 A | 10/2002 |
| JP | 2006-260354 A | 9/2006 |

(Continued)

OTHER PUBLICATIONS

Prada-Rojas et al., Observation tools for debugging and performance analysis of embedded linux applications, [Online] 2009, Conference on System Software, SoC and Silicon Debug-S4D, [Retrieved from the Internet] <http://mescal.imag.fr/membres/carlos.prada/publications/Paper_S4D-2009.pdf> 6 pages.*

(Continued)

*Primary Examiner* — Thuy Dao
*Assistant Examiner* — Ravi K Sinha
(74) *Attorney, Agent, or Firm* — Stein IP, LLC

(57) ABSTRACT

The present invention relates to a system and method for testing a user application using a computing apparatus and a media playback apparatus. According to the present invention, the media playback apparatus tests the user application which is generated by executing a developer application in a computing apparatus, wherein the computing apparatus is connected to the media playback apparatus through a network. Thus, applications stored in a plurality of computing apparatuses can be tested using a single media playback apparatus.

15 Claims, 6 Drawing Sheets

(56) References Cited

U.S. PATENT DOCUMENTS

| | | | | |
|---|---|---|---|---|
| 6,618,854 | B1 | 9/2003 | Mann | 717/124 |
| 7,167,820 | B2 * | 1/2007 | Sarfati | H04N 17/004 |
| | | | | 348/E17.003 |
| 7,451,206 | B2 * | 11/2008 | Geck et al. | 709/224 |
| 7,669,186 | B2 * | 2/2010 | Nolan et al. | 717/124 |
| 7,774,757 | B1 * | 8/2010 | Awasthi et al. | 717/127 |
| 7,779,390 | B1 * | 8/2010 | Allavarpu | G06F 11/3664 |
| | | | | 717/124 |
| 7,992,133 | B1 * | 8/2011 | Theroux | G06F 11/3664 |
| | | | | 709/201 |
| 8,015,548 | B2 * | 9/2011 | Chen et al. | 717/118 |
| 8,336,029 | B1 * | 12/2012 | McFadden | G06F 9/45516 |
| | | | | 717/100 |
| 8,402,170 | B2 * | 3/2013 | Harris | G06F 11/366 |
| | | | | 711/100 |
| 2005/0144507 | A1 * | 6/2005 | Lee | G06F 11/366 |
| | | | | 714/4.1 |
| 2005/0172168 | A1 * | 8/2005 | Kilian | G06F 11/362 |
| | | | | 714/31 |
| 2006/0020912 | A1 * | 1/2006 | Illowsky | G06F 11/2082 |
| | | | | 717/103 |
| 2007/0113218 | A1 * | 5/2007 | Nolan et al. | 717/124 |
| 2007/0168989 | A1 * | 7/2007 | Edwards | G06F 11/3636 |
| | | | | 717/127 |
| 2008/0115107 | A1 * | 5/2008 | Arguelles | G06F 11/3668 |
| | | | | 717/124 |
| 2008/0141221 | A1 * | 6/2008 | Benesovska | G06F 11/3688 |
| | | | | 717/124 |
| 2009/0103902 | A1 * | 4/2009 | Matsuura et al. | 386/124 |
| 2009/0198484 | A1 * | 8/2009 | Christensen | G06F 11/3668 |
| | | | | 703/22 |
| 2010/0161281 | A1 * | 6/2010 | Brown | G06F 11/3664 |
| | | | | 702/186 |
| 2010/0287571 | A1 * | 11/2010 | Mohammed | G06F 8/20 |
| | | | | 719/328 |
| 2011/0258603 | A1 * | 10/2011 | Wisnovsky | G06F 11/3612 |
| | | | | 717/125 |
| 2011/0307871 | A1 * | 12/2011 | Branda | G06F 11/3664 |
| | | | | 717/129 |
| 2012/0054871 | A1 * | 3/2012 | Soby | G06F 11/3664 |
| | | | | 726/25 |
| 2012/0209571 | A1 * | 8/2012 | Peterson | G06F 11/3664 |
| | | | | 702/186 |
| 2013/0305222 | A1 * | 11/2013 | Cinar | G06F 11/3664 |
| | | | | 717/124 |
| 2013/0311827 | A1 * | 11/2013 | Drory | G06F 11/3664 |
| | | | | 714/32 |

FOREIGN PATENT DOCUMENTS

| | | |
|---|---|---|
| JP | 2007-219695 A | 8/2007 |
| JP | 2007-280112 A | 10/2007 |
| KR | 2002-0027467 A | 4/2002 |
| KR | 2003-0089305 | 11/2003 |
| KR | 10-2006-0023862 A | 3/2006 |
| KR | 10-2009-0028368 A | 3/2009 |
| WO | WO 01/04751 A2 * | 1/2001 |
| WO | WO 2007-111208 A1 | 10/2007 |

OTHER PUBLICATIONS

Yuzhong Shen, Teaching game development using microsoft XNA game studio, [Online 2009], In Proceedings of the 2009 Spring Simulation Multiconference (SpringSim '09). Society for Computer Simulation International, San Diego, CA, USA, Article 100, [Retrieved from the Internet] <http://delivery.acm.org/10.1145/1640000/1639914/a100-shen.pdf> 6 pages.*

Narayanasamy et al., BugNet: Continuously Recording Program Execution for Deterministic Replay Debugging, [Online] May 2005, SIGARCH Comput. Archit. News 33, 2 (May 2005), [Retrieved from the Internet] <http://doi.acm.org/10.1145/1080695.1069994> pp. 284-295.*

Search report filed in PCT/KR2010/008457.

First Office Action dated Mar. 18, 2011, issued by Korean Patent Office for Korean Patent Application 10-2009-0115297.

International Search Report dated Jul. 7, 2011, issued by WIPO for International Application PCT/KR2010/008457.

Notice of Allowance dated Nov. 3, 2011, issued by Korean Patent Office for Korean Patent Application 10-2009-0115297.

First Office Action dated Jun. 13, 2013, issued by Japanese Patent Office for Japanese Patent Application 2012-541023.

Notice of Allowance dated Nov. 29, 2013, issued by Japanese Patent Office for Japanese Patent Application 2012-541024.

First Office Action dated Mar. 14, 2014, issued by Chinese Patent Office for Chinese Patent Application 201080053571.1.

* cited by examiner

SYSTEM AND METHOD FOR TESTING A USER APPLICATION USING A COMPUTING APPARATUS AND A MEDIA PLAYBACK APPARATUS

CROSS-REFERENCE TO RELATED APPLICATIONS

This application claims the benefit of PCT International Patent Application No. PCT/KR2010/008457, filed Nov. 26, 2010, and Korean Patent Application No. 10-2009-0115297, filed Nov. 26, 2009, in the Korean Intellectual Property Office, the disclosures of which are incorporated herein by reference.

BACKGROUND OF THE INVENTION

1. Field of the Invention

The present invention relates to a system and method for testing a user application using a computing apparatus and a media playback apparatus, and more particularly, to a system and method for testing a user application, which is generated by executing a developer application in a computing apparatus, using a computing apparatus and a media playback apparatus.

2. Description of the Related Art

A Blu-ray disc (referred to as "BD" hereinafter) provides not only HD images through a Blu-ray disc player (referred to as "BDP" hereinafter) but also various user applications executed in the BDP.

A user can be provided with a service by selecting a desired user application from various user applications stored in a BD and executing the selected user application. For example, when the user selects and executes a VOD application, a BDP accesses a VOD server to provide video selected by the user in real time.

A user application executed in a BDP is generated by compiling a source code configured in JAVA.

FIG. 1 illustrates a conventional user application development environment.

Referring to FIG. 1, a user generates a user application using application development software installed in a computing apparatus 10 such as a PC. Specifically, the user generates a source code using the application development software. The user creates a user application by compiling the source code using a compiler included in the application development software.

To test and debug the generated user application, the user stores the user application in a storage unit 20 such as a BD. The user inserts the storage unit 20 into a media playback apparatus 30 to execute the user application stored in the storage unit 20.

The media playback apparatus 30 outputs a debugging message and a log message, which are generated by the user application, through a display unit 40.

The user corrects and compiles the source code with reference to the debugging message and the log message and repeats the above-mentioned procedure.

In the conventional user application development environment, it is necessary to store a corrected user application in the storage unit 20 to test and debug the corrected user application whenever a source code is corrected.

Particularly, to test a user application executed in a media playback apparatus using a disc storage device such as a BD, an additional recording device capable of recording a user application in the disc storage device is required, resulting in additional costs for implementing an application development environment. Even when the disc storage device includes the recording device, the user has to insert the disc storage device on which a user application is recorded into the media playback apparatus, and test and debug the user application whenever the user application is corrected.

Furthermore, the user needs to check a debugging message and a log message, generated during a test and debugging process, through a display unit. Accordingly, if a plurality of debugging messages and log messages are generated, the user may not check some of the messages and may not store the debugging messages and log messages.

To solve these problems, there has been proposed a method of testing and debugging a user application by installing media player simulation software in a computing apparatus.

However, because the simulation software cannot implement the same test environment as a physical media player, even a user application, which is executed without generating an error in the test environment of the simulation software, can frequently generate errors when executed in the physical media player.

SUMMARY OF THE INVENTION

An object of the present invention is to provide a system and method for testing a user application using a computing apparatus and a media playback apparatus, which are capable of testing a user application that is generated by executing a developer application in a computing apparatus such that applications stored in a plurality of computing apparatuses can be tested using a single media playback apparatus.

The object of the present invention can be achieved by providing a user application test system comprising a computing apparatus generating one or more user applications and a media playback apparatus executing the one or more user applications, the computing apparatus executing an application provision program including: a first instruction for transmitting information about the one or more user applications to the media playback apparatus in response to a user application information request of the media playback apparatus, which is received from the media playback apparatus; a second instruction for receiving a user application request for a user application, which is selected by the media playback apparatus from the one or more user applications, from the media playback apparatus; and a third instruction for transmitting the user application selected by the media playback apparatus to the media playback apparatus in response to the user application request, the media playback apparatus executing a developer application comprising: a fourth instruction for transmitting the user application information request to the computing apparatus; a fifth instruction for receiving the information about the user applications transmitted from the computing apparatus; a sixth instruction for transmitting the user application request to the computing apparatus; a seventh instruction for receiving the user application transmitted from the computing apparatus; and an eighth instruction for executing the user application received by executing the seventh instruction to test the user application.

The user application and the developer application may be based on Java.

The developer application may further include a ninth instruction for transmitting debugging information generated by executing the selected user application to the computing apparatus, and the application provision program may further include a tenth instruction for receiving the debugging information from the media playback apparatus.

The application provision program may further include an eleventh instruction for storing the debugging information in a storage unit of the computing apparatus.

The developer application may further include a twelfth instruction for transmitting the debugging information to a logging server.

The application provision program may further include a thirteenth instruction for displaying the debugging information on a display unit.

The media playback apparatus may download the developer application from a developer application storage server and execute the developer application.

The developer application may further include a fourteenth instruction for transmitting a configuration request for configuration information of the computing apparatus to the computing apparatus, and the application provision program further comprises a fifteenth instruction for transmitting the configuration information to the media playback apparatus in response to the configuration request.

The developer application may further include a sixteenth instruction for displaying the configuration information and the information about the user applications on a display unit before the sixth instruction is executed.

The media playback apparatus may include a Blu-ray disc player.

The object of the present invention can be achieved by providing a method for testing one or more user applications generated by a computing apparatus and executed in a media playback apparatus, the method including steps of: (a) the computing apparatus executing an application provision program to provide a user application to the media playback apparatus; and (b) the media playback apparatus executing a developer application to test the user application, wherein the step (a) includes steps of: (a-1) transmitting information about the one or more user applications to the media playback apparatus in response to a user application information request of the media playback apparatus, which is received from the media playback apparatus; (a-2) receiving a user application request for a user application, which is selected by the media playback apparatus from the one or more user applications, from the media playback apparatus; and (a-3) transmitting the user application selected by the media playback apparatus to the media playback apparatus in response to the user application request, and wherein the step (b) includes steps of: (b-1) transmitting the user application information request to the computing apparatus; (b-2) receiving the information about the user applications transmitted from the computing apparatus; (b-3) transmitting the user application request to the computing apparatus; (b-4) receiving the user application transmitted from the computing apparatus; and (b-5) executing the user application received by executing the seventh instruction to test the user application.

The user application and the developer application may be based on Java.

The step (b) may further include step of (b-6) transmitting debugging information generated by executing the selected user application to the computing apparatus, and the step (a) may further include step of (a-4) receiving the debugging information from the media playback apparatus.

The step (a) may further include step of (a-5) storing the debugging information in a storage unit of the computing apparatus.

The step (b) may further include step of (b-7) transmitting the debugging information to a logging server.

The step (b) may further include step of (b-8) displaying the debugging information on a display unit.

The developer application may be downloaded from a developer application storage server and executed prior to the step (b).

The step (b) may further include step of transmitting a configuration request for configuration information of the computing apparatus to the computing apparatus before the step (b-1), and the step (a) may further include step of transmitting the configuration information to the media playback apparatus in response to the configuration request.

The method may further include step of displaying the configuration information and the information about the user applications on a display unit before the step (b-3).

The media playback apparatus may include a Blu-ray disc player.

The system and method for testing a user application using a computing apparatus and a media playback apparatus according to the present invention have the following advantages.

Since a user application which is generated by executing a developer application in a computing apparatus connected to the media playback apparatus through a network is tested, applications stored in a plurality of computing apparatuses can be tested using a single media playback apparatus. Accordingly, it is unnecessary for the media playback apparatus to include an additional recording device that records user applications on a disc.

In addition, a user can select and test a user application displayed on a display unit connected to the media playback apparatus according to the present invention. Therefore, the user can easily test the user application without inserting a disc storage device storing the user application into the media playback apparatus and testing and debugging the user application whenever the user application is corrected.

Furthermore, the user can easily check a debugging message generated during a test and debugging procedure since the debugging message is stored in a computing apparatus or a logging server.

Moreover, a user application can be easily and correctly tested even if simulation software of the media playback apparatus is not used.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
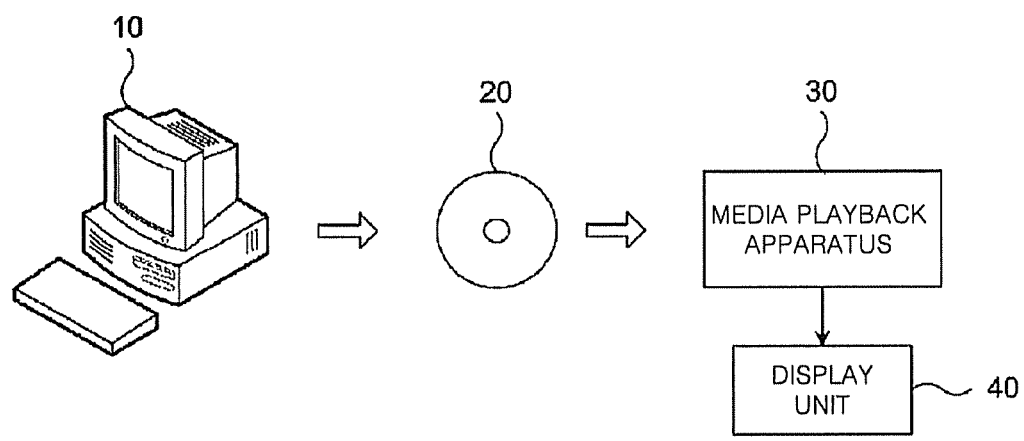
FIG. 1 illustrates a conventional user application development environment.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Preferred embodiments of a media playback apparatus capable of testing a user application and a method for testing a user application using the same according to the present invention will now be described with reference to the attached drawings.

Figure 2:
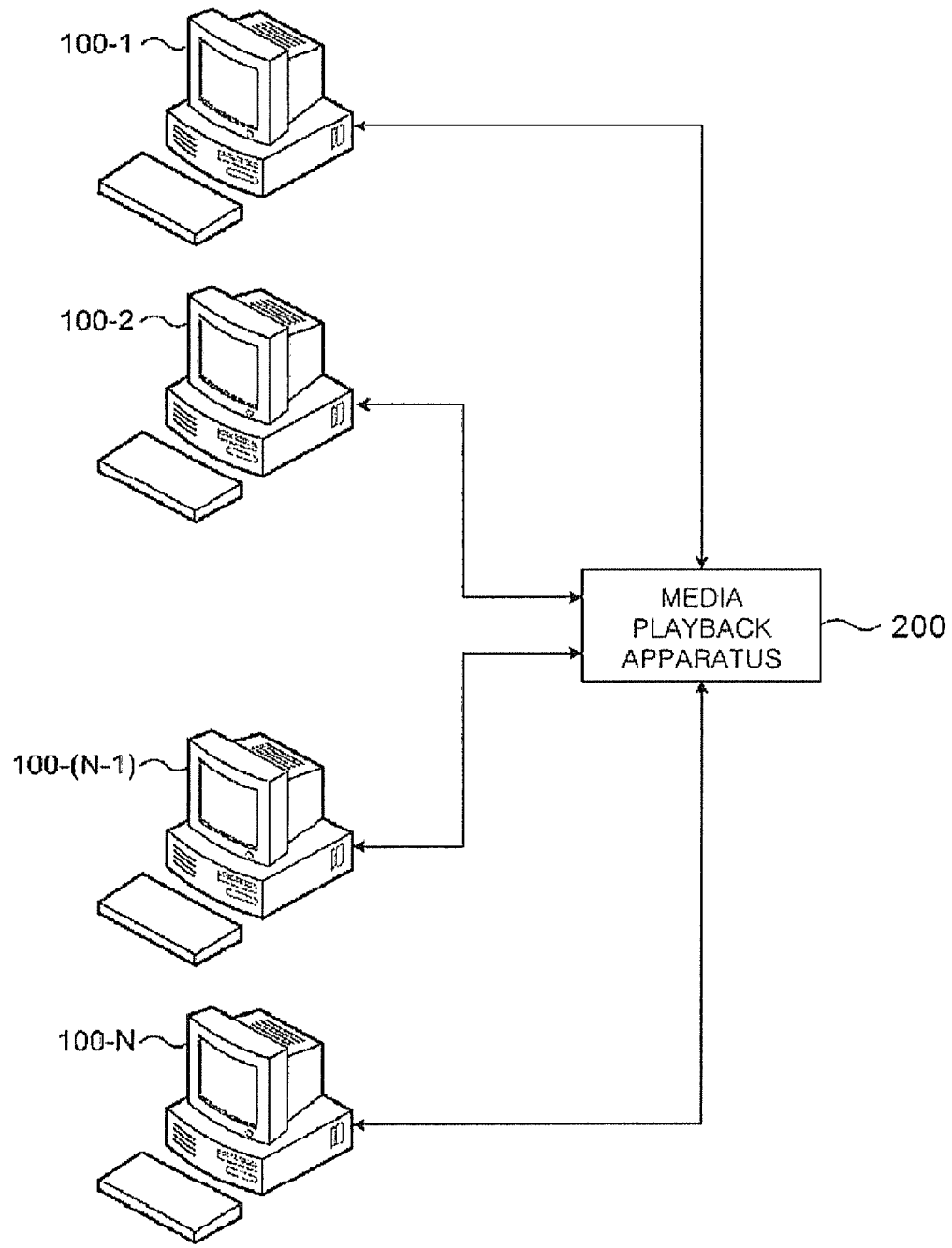
FIG. 2 illustrates a user application test system according to the present invention.

FIG. 2 illustrates a user application development environment according to the present invention.

Referring to FIG. 2, the user application development environment of the present invention includes one or more computing apparatuses 100-1 to 100-N and a media playback apparatus 200.

Application development software for developing a user application executed in the media playback apparatus 200 is installed in each of the computing apparatuses 100-1 to 100-N. A user can generate a JAVA-based source code using the application development software and create a user application by compiling the source code.

A user application is software executed in the media playback apparatus 200. While user applications may include a VOD application, a word processor application, and a game application, the user applications are not limited thereto.

An application provision program including one or more instructions, which provides a user application at the request of a user, is installed and executed in the computing apparatus 100. Upon execution of the application provision program, the computing apparatus 100 can provide the user application to the media playback apparatus 200.

The media playback apparatus 200 preferably includes a BDP and can execute a JAVA-based user application. The media playback apparatus 200 can read and execute a developer application for implementing the present invention. Hereinafter, the media playback apparatus refers to an apparatus capable of reproducing audio/video data stored in various storage devices such as a BD, DVD, flash memory storage unit, a hard disc, etc. and executing user applications.

Upon execution of the developer application, the media playback apparatus 200 can transmit a configuration information request, a user application information request, a user application request, and debugging information to the computing apparatus 100 and receive a user application 150 from the computing apparatus 100, by communicating with the computing apparatus 100.

A user application test system according to the present invention will now be described in detail.

Figure 3:
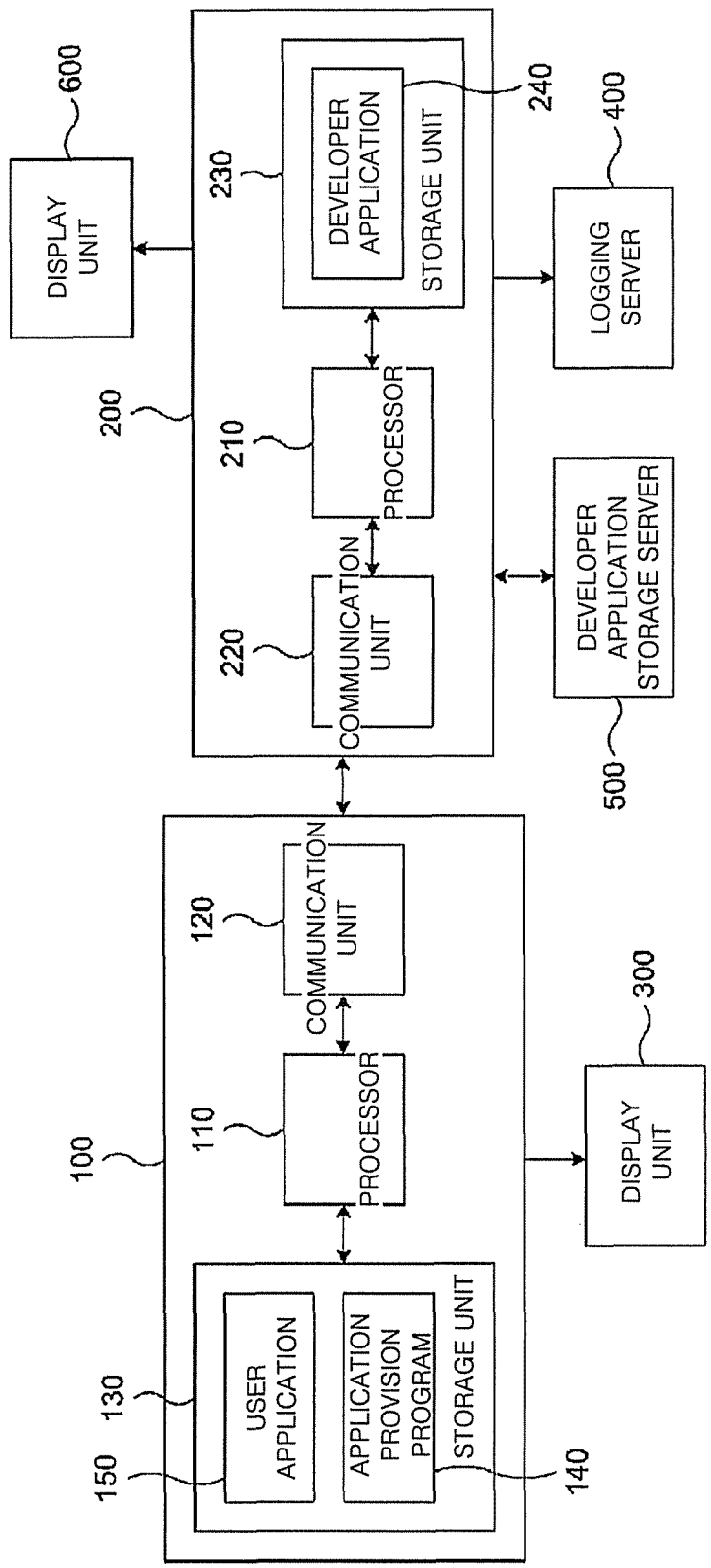
FIG. 3 is a block diagram illustrating the configuration of the user application test system according to the present invention in detail.

FIG. 3 is a block diagram illustrating the configuration of the user application test system according to the present invention in detail.

Referring to FIG. 3, the computing apparatus 100 according to the present invention includes one or more user applications 150, a storage unit 130, a processor 110, a communication unit 120, and an application provision program 140.

The one or more user applications 150 correspond to software executed in the media playback apparatus 200. While the one or more user applications 150 can include a VOD application, a word processor application, a game application, etc., the user applications 150 are not limited thereto. The user applications 150 can be generated by compiling Java-based source codes created using the application development software.

The storage unit 130 stores the application provision program 140 and the user applications 150. The storage unit 130 may be a BD, a hard disc, a flash memory, a RAM, a ROM, or a USB storage unit. However, the storage unit 130 is not limited thereto.

The processor 110 generates the user applications 150 and executes the application provision program 140. The processor 110 is a central processing unit (CPU) and controls the overall operation of the computing apparatus 100. In addition, the processor 110 compiles a source code created using the application development software through a compiler and stores the generated user applications 150 in the storage unit 130.

The communication unit 120 communicates with the media playback apparatus 200 under the control of the processor 110. The communication unit 120 may be the Ethernet supporting LAN.

The application provision program 140 is executed by the processor 110 and includes one or more instructions. The processor 110 executes the one or more instructions included in the application provision program 140.

A detailed description will be given of the application provision program 140 according to the present invention.

Figure 4:
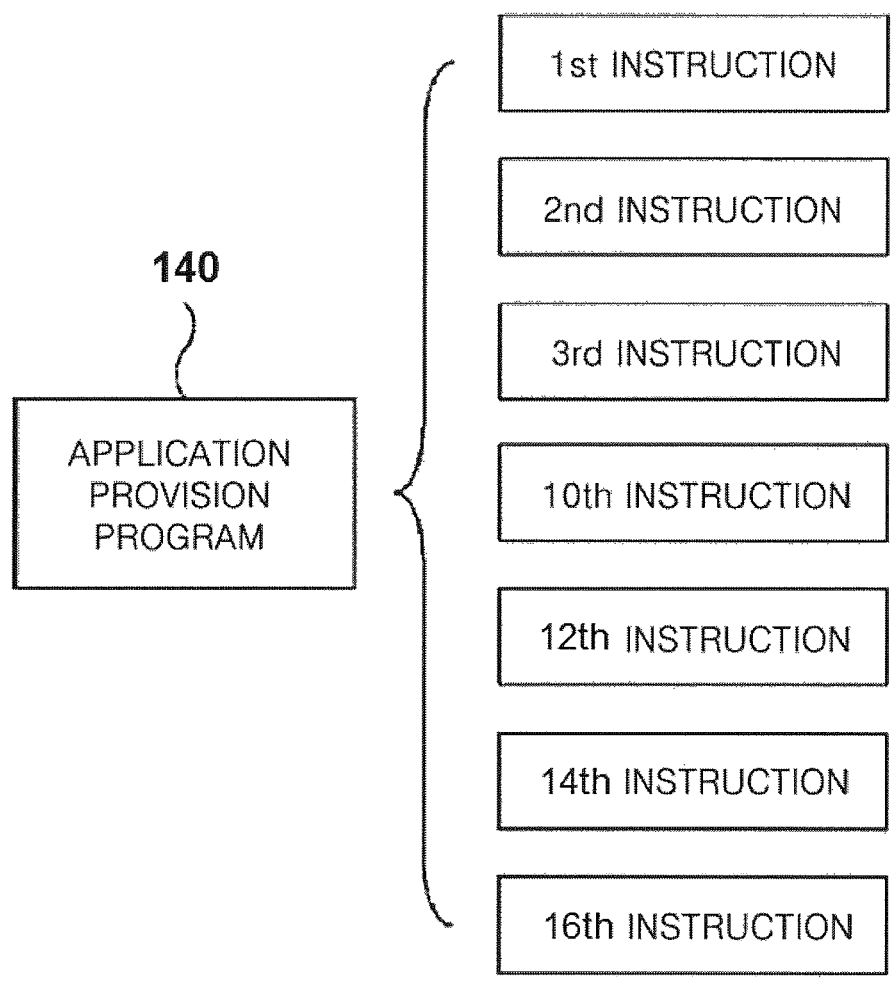
FIG. 4 illustrates an application provision program according to the present invention.

FIG. 4 illustrates the application provision program 140 stored in the computing apparatus according to the present invention.

Referring to FIG. 4, the application provision program 140 stored in the computing apparatus according to the present invention includes first to third instructions, a tenth instruction, a twelfth instruction, a fourteenth instruction, and a sixteenth instruction. The tenth, twelfth, fourteenth and sixteenth instructions are optional and may not be included in the application provision program 140. The application provision program 140 may be plug-in of the application development software.

The processor 110 transmits information about the one or more user applications 150 to the media playback apparatus 200 in response to a user application information request of the media playback apparatus 200, received through the communication unit 120, according to the first instruction. The information about the one or more user applications 150 may include the titles of the user applications 150 stored in the storage unit 120.

Prior to execution of the first instruction, the processor 110 can transmit configuration information of the computing apparatus 100 to the media playback apparatus 200 in response to a configuration request of the media playback apparatus 200, received through the communication unit 120, according to the twelfth instruction. The configuration information may include the IP address and computer name of the computing apparatus 100.

Upon reception of the information about the one or more user applications 150, the media playback apparatus 200 selects one from the one or more user applications 150.

Then, the processor 110 receives a user application request for a user application, selected by the media playback apparatus 200 from the one or more user applications 150, from the media playback apparatus 200 through the communication unit 120 according to the second instruction.

The processor 110 transmits the user application 150, selected by the media playback apparatus 200, to the media playback apparatus 200 through the communication unit 120 according to the third instruction.

Upon reception of the selected user application 150, the media playback apparatus 200 executes the selected user application 150. When the selected user application 150 is executed, debugging information is generated.

The processor 110 receives the debugging information which is generated by executing the selected user application 150 from the media playback apparatus 200 according to the tenth instruction.

Subsequently, the processor 110 stores the received debugging information in the storage unit 130 according to the fourteenth instruction.

The processor 110 displays the debugging information on a display unit 300 according to the sixteenth instruction.

Referring back to FIG. 3, the media playback apparatus 200 includes a processor 210, a communication unit 220 and a storage unit 230.

The processor 210 executes a developer application 240 and controls the overall operation of the media playback apparatus 200.

The communication unit 220 communicates with the computing apparatus 100 which generates user applications, under the control of the processor 210. The communication unit 220 may be the Ethernet supporting LAN.

The storage unit 230 stores one of the developer application 240 and information about a download link of the developer application 240. The storage unit 230 may be a BD, a hard disc, a flash memory, a RAM, a ROM, or a USB storage unit. However, the storage unit 230 is not limited thereto.

When the developer application 240 is stored in the storage unit 230, the processor 210 can read the developer application 240 from the storage unit 230 and execute the read developer application 240. When the information on the download link of the developer application 240 is stored in the storage unit 230, the processor 210 can download the developer application 240 from a developer application storage server 500 according to the download link and execute the developer application 240.

The developer application 240 includes one or more instructions and the processor 210 performs the one or more instruction by executing the developer application 240. The developer application 240 is preferably based on JAVA and the media playback apparatus 200 tests a user application by executing the developer application 240.

A detailed description will be made of the developer application 240.

Figure 5:
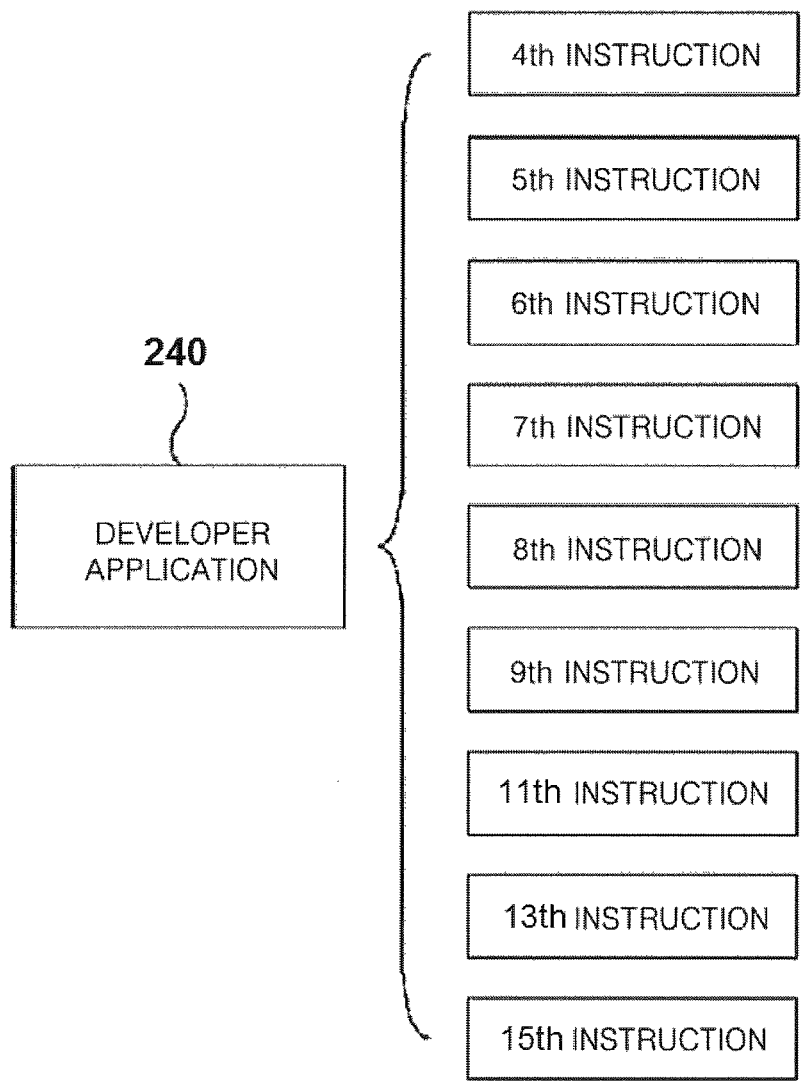
FIG. 5 illustrates a developer application according to the present invention.

As shown in FIG. 5, the developer application 240 includes fourth to ninth instructions and can further include eleventh, thirteenth and fifteenth instructions.

When the developer application 240 is executed, the processor 210 can transmit a configuration request for configuration information of the computing apparatus 100 to the computing apparatus 100 according to the eleventh instruction. The computing apparatus 100 transmits the configuration information thereof to the media playback apparatus 200 in response to the configuration request of the media playback apparatus 200. The configuration information may include the IP address and computer name of the computing apparatus 100. When one or more computing apparatuses 100 are present, the media playback apparatus 200 can broadcast the configuration request and one or more computing apparatuses 100 can transmit configuration information thereof to the media playback apparatus 200 upon reception of the configuration request.

The processor 210 transmits a user application information request to the computing apparatus 100 through the communication unit 220 according to the fourth instruction. The computing apparatus 100 transmits information about one or more user applications stored in the computing apparatus 100 to the media playback apparatus 200 in response to the user application information request. The information about a user application may include the title of the user application.

The processor 210 receives the information about one or more user applications from the computing apparatus 100 according to the fifth instruction.

The processor 210 can display the configuration information and the information about one or more user applications on the display unit according to the thirteenth instruction. The user can select a user application to be tested with reference to the configuration information and the information about user applications, displayed on the display unit. Particularly, when one or more computing apparatuses 100 are present, the user can identify the computing apparatus 100 with reference to the configuration information.

The processor 210 transmits a user application request for a user application selected with reference to the configuration information and the information about user applications to the computing apparatus 100 through the communication unit 220 according to the sixth instruction.

Upon reception of the user application request, the computing apparatus 100 transmits the selected user application to the media playback apparatus 200 in response to the user application request.

The processor 210 receives the user application transmitted from the computing apparatus 100 through the communication unit 220 according to the seventh instruction.

The processor 210 executes the received user application according to the eighth instruction to test the same.

Upon execution of the user application, debugging information is generated.

The processor 210 can transmit the debugging information generated by executing the user application to the computing apparatus 100 according to the ninth instruction.

The processor 210 can transmit the debugging information to a logging server 400 according to the fifteenth instruction. Simultaneously, the processor 210 can display the debugging information on the display unit 600 according to the sixteenth instruction. The debugging information transmitted to the logging server 400 is stored in the logging server 400, and thus the user can view the debugging information stored in the logging server 400.

A method for testing a user application according to the present invention will now be described in detail.

Figure 6:
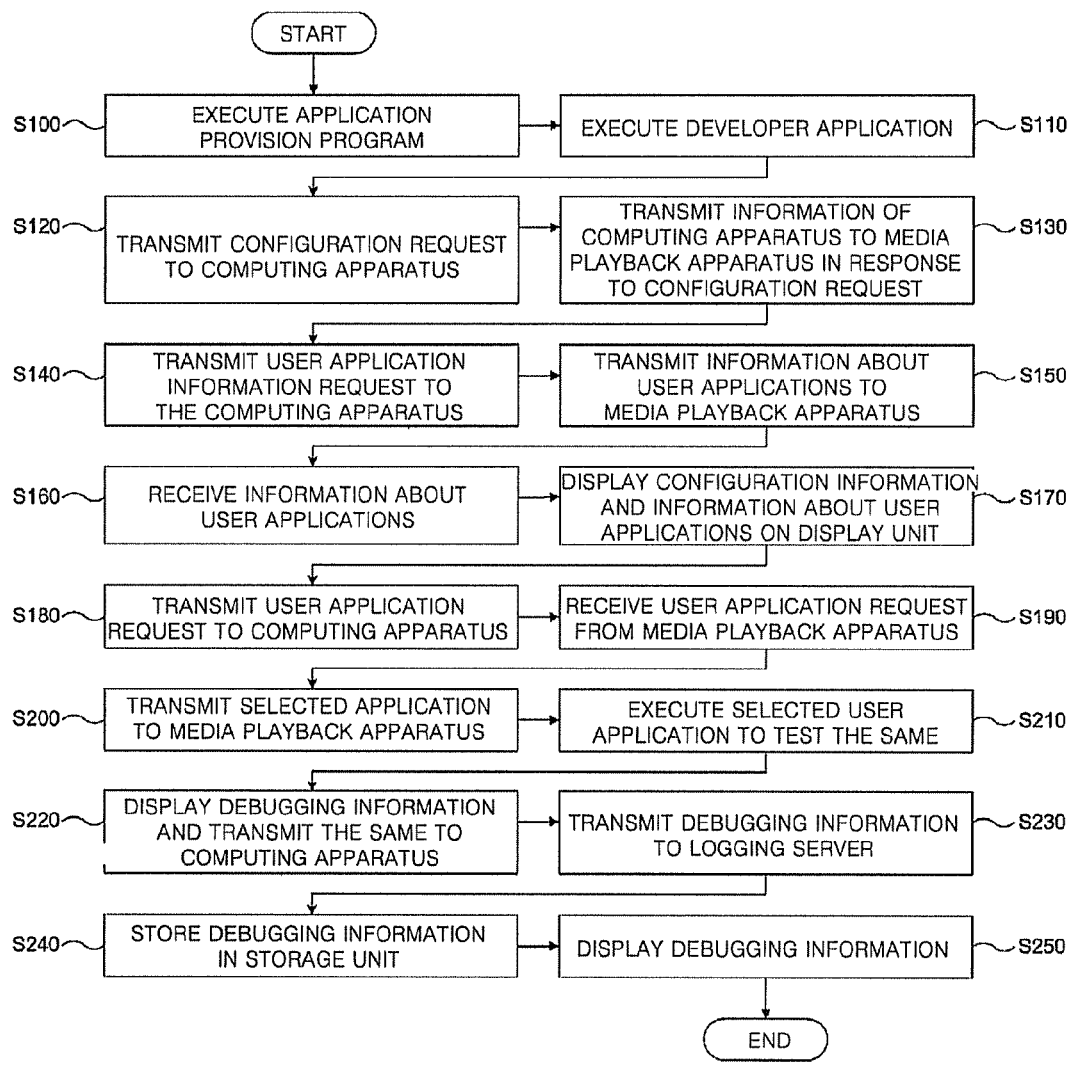
FIG. 6 is a flowchart illustrating a method of providing a user application according to the present invention.

FIG. 6 is a flowchart illustrating a method for testing a user application according to the present invention.

Referring to FIG. 6, a computing apparatus reads and executes an application provision program (S100).

A media playback apparatus reads and executes a developer application. Otherwise, if information on a download link of the developer application is present in a storage unit, the media playback apparatus downloads the developer application from a developer application storage server according to the download link (S100).

It is noted that the media playback apparatus operates according to instructions included in the developer application and the computing apparatus operates according to instructions included in the application provision program. Accordingly, each step of the user application test method according to the present invention is performed by the media playback apparatus or the computing apparatus according to an instruction included in the developer application or an instruction included in the application provision program.

The media playback apparatus reads the developer application stored in the storage unit and executes the read developer application, or if information on a download link of the developer application is present in the storage unit, downloads the developer application from the developer application storage server according to the download link (S110).

The media playback apparatus transmits a configuration request for configuration information of the computing apparatus to the computing apparatus (S120). The configuration information may include the IP address and computer name of the computing apparatus. When one or more computing apparatuses are present, the media playback apparatus can broadcast the configuration request and one or more computing apparatuses can transmit configuration thereof to the media playback apparatus upon reception of the configuration request.

The computing apparatus transmits configuration information thereof to the media playback apparatus in response to the configuration request received from the media playback apparatus (S130).

The media playback apparatus transmits a user application information request to the computing apparatus (S140).

The computing apparatus transmits information about one or more user applications to the media playback apparatus in response to the user application information request received from the media playback apparatus (S150).

The media playback apparatus receives the information about user applications transmitted from the computing apparatus (160).

The media playback apparatus displays the configuration information and the information about user applications on a display unit (S170) such that a user can select a user application to be tested with reference to the configuration information and the information about user applications, which are displayed on the display unit. Particularly, when one or more computing apparatuses are present, the user can identify the computing apparatuses with reference to the configuration information.

The media playback apparatus transmits a user application request for a user application, which is selected with reference to the information about user applications, to the computing apparatus (S180).

The computing apparatus receives the user application request from the media playback apparatus (S190).

The computing apparatus transmits the selected user application to the media playback apparatus (S200).

The media playback apparatus executes the user application transmitted from the computing apparatus to test the same (S210).

Upon execution of the selected user application, debugging information is generated.

The media playback apparatus displays the generated debugging information on the display unit connected thereto and transmits the debugging information to the computing apparatus (S220).

The media playback apparatus transmits the debugging information to a logging server (S230). The debugging information transmitted to the logging server is stored therein, and thus the user can view the debugging information stored in the logging server.

The computing apparatus stores the debugging information received from the media playback apparatus in a storage unit thereof (S240).

The computing apparatus can display the debugging information on a display unit connected thereto (S250). The user can correct a source code with reference to the debugging information.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method for testing one or more user applications generated by a computing apparatus and executed in a media playback apparatus, the method comprising steps of:
   (a) at the computing apparatus, executing an application provision program to provide a user application to the media playback apparatus; and
   (b) at the media playback apparatus, executing a developer application to test the user application,
   wherein the step (a) comprises steps of:
   (a-1) transmitting information about the one or more user applications to the media playback apparatus in response to a user application information request of the media playback apparatus, which is received from the media playback apparatus;
   (a-2) receiving a user application request for a user application, which is selected by the media playback apparatus from the one or more user applications, from the media playback apparatus; and
   (a-3) transmitting the user application selected by the media playback apparatus to the media playback apparatus in response to the user application request, and
   wherein the step (b) comprises steps of:
   (b-1) transmitting the user application information request to the computing apparatus;
   (b-2) receiving the information about the user applications transmitted from the computing apparatus;
   (b-3) transmitting the user application request to the computing apparatus;
   (b-4) receiving the user application transmitted from the computing apparatus; and
   (b-5) executing the received user application to test the same by the developer application executed at the media playback apparatus,
   wherein the step (b) further comprises steps of:
   (b-6) transmitting only once debugging information generated by executing the selected user application to the computing apparatus; and
   (b-7) broadcasting a configuration request for configuration information of the computing apparatus to the computing apparatus before the step (b-1), and
   wherein the step (a) further comprises steps of:
   (a-4) receiving only once the debugging information from the media playback apparatus; and
   (a-5) transmitting the configuration information to the media playback apparatus in response to the configuration request before the step (a-1).

2. The method according to claim 1, wherein the user application and the developer application are based on Java.

3. The method according to claim 1, wherein the step (a) further comprises step of (a-6) storing the debugging information in a storage unit of the computing apparatus.

4. The method according to claim 1, wherein the step (b) further comprises step of (b-8) transmitting the debugging information to a logging server.

5. The method according to claim 1, wherein the step (b) further comprises step of (b-9) displaying the debugging information on a display unit.

6. The method according to claim 1, wherein the developer application is downloaded from a developer application storage server and executed prior to the step (b).

7. The method according to claim 1, further comprising step of displaying the configuration information and the information about the user applications on a display unit before the step (b-3).

8. The method according to claim 1, wherein the media playback apparatus comprises a Blu-ray disc player.

9. A user application test system comprising:
a computing apparatus having a memory storing executable instruction for generating one or more user applications, and a media playback apparatus executing the one or more user applications,
the computing apparatus executing an
application provision program comprising:
a first instruction for transmitting information about the one or more user applications to the media playback apparatus in response to a user application information request of the media playback apparatus, which is received from the media playback apparatus;
a second instruction for receiving a user application request for a user application, which is selected by the media playback apparatus from the one or more user applications, from the media playback apparatus; and
a third instruction for transmitting the user application selected by the media playback apparatus to the media playback apparatus in response to the user application request, and
the media playback apparatus executing a developer application comprising:
a fourth instruction for transmitting the user application information request to the computing apparatus;
a fifth instruction for receiving the information about the user applications transmitted from the computing apparatus;
a sixth instruction for transmitting the user application request to the computing apparatus;
a seventh instruction for receiving the user application transmitted from the computing apparatus; and
an eighth instruction for executing the user application received by executing the seventh instruction to test the user application,
wherein the developer application executed at the media playback apparatus further comprises:
a ninth instruction for transmitting only once debugging information generated by executing and testing the selected user application to the computing apparatus; and
an eleventh instruction for broadcasting a configuration request for configuration information of the computing apparatus to one or more the computing apparatus before the fourth instruction is executed,
a thirteenth instruction for displaying the configuration information and the information about the user applications on a display unit before the sixth instruction is executed, and
wherein the application provision program executed at the computing apparatus further comprises:
a tenth instruction for receiving only once the debugging information from the media playback apparatus; and
a twelfth instruction for transmitting the configuration information to the media playback apparatus in response to the configuration request before the first instruction.

10. The user application test system according to claim 9, wherein the user application and the developer application are based on Java.

11. The user application test system according to claim 9, wherein the application provision program further comprises a fourteenth instruction for storing the debugging information in a storage unit of the computing apparatus.

12. The user application test system according to claim 1, wherein the developer application further comprises a fifteenth instruction for transmitting the debugging information to a logging server.

13. The user application test system according to claim 9, wherein the application provision program further comprises a sixteenth instruction for displaying the debugging information on a display unit.

14. The user application test system according to claim 9, wherein the media playback apparatus downloads the developer application from a developer application storage server and executes the developer application.

15. The user application test system according to claim 9, wherein the media playback apparatus comprises a Blu-ray disc player.

* * * * *